UNITED STATES PATENT OFFICE.

JAMES W. TALLMADGE, OF BOSTON, MASSACHUSETTS.

IMPROVEMENT IN MEDICAL COMPOUNDS FOR TOOTHACHE.

Specification forming part of Letters Patent No. 146,149, dated January 6, 1874; application filed September 3, 1873.

*To all whom it may concern:*

Be it known that I, JAMES W. TALLMADGE, of the city of Boston, county of Suffolk and State of Massachusetts, have invented a Medical Compound called "Tallmadge's Instantaneous Toothache-Cure," of which the following is a specification:

*Recipe.*—Dissolve one ounce of sal-soda in one pint of water; dissolve one ounce of sal-ammoniac in one pint of water; and dissolve one ounce of chemically-pure potash in one quart of water, after which mix the solutions of sal-soda and sal-ammoniac together; then add the solution of potash, shake up thoroughly, and bottle in half-ounce bottles.

*Directions for use.*—Saturate a piece of cotton with this liquid, and place it in the cavity of the tooth that aches. If there is no cavity, apply to the outside of the tooth. If more than one or a great number of the teeth ache, dilute the fluid with water, and rinse the mouth with it.

I claim as my invention—

The compound of the solutions of sal-soda, sal-ammoniac, and potash, herein described, for the purpose specified.

JAMES W. TALLMADGE.

Witnesses:
WM. R. WILLIAMS,
BJ. W. FELTON.